(12) United States Patent
Evans et al.

(10) Patent No.: US 12,455,248 B1
(45) Date of Patent: Oct. 28, 2025

(54) PACKAGING LINE MONITORING SYSTEMS AND METHODS

(71) Applicant: LuxTronic, Inc., Greenwood Village, CO (US)

(72) Inventors: James C. Evans, Englewood, CO (US); Paul Stuart George, Denver, CO (US); Christopher J. Piekarski, Broomfield, CO (US)

(73) Assignee: LuxTronic, Inc., Centennial, CO (US)

( * ) Notice: Subject to any disclaimer, the term of this patent is extended or adjusted under 35 U.S.C. 154(b) by 253 days.

(21) Appl. No.: 18/481,619

(22) Filed: Oct. 5, 2023

Related U.S. Application Data

(60) Provisional application No. 63/378,432, filed on Oct. 5, 2022.

(51) Int. Cl.
*G01N 21/95* (2006.01)
*B65B 57/00* (2006.01)
*G06T 7/00* (2017.01)

(52) U.S. Cl.
CPC ............ *G01N 21/95* (2013.01); *B65B 57/00* (2013.01); *G06T 7/0004* (2013.01); *G06T 2207/20081* (2013.01)

(58) Field of Classification Search
CPC ...... G01N 21/95; B65B 57/00; G06T 7/0004; G06T 2207/20081
See application file for complete search history.

(56) References Cited

FOREIGN PATENT DOCUMENTS

KR 200267533 Y1 * 3/2002
WO WO-9916010 A1 * 4/1999 ........... G06T 7/0006

* cited by examiner

*Primary Examiner* — David P Porta
*Assistant Examiner* — Fani Polyzos Boosalis
(74) *Attorney, Agent, or Firm* — AVEK IP, LLC

(57) ABSTRACT

A monitoring system for mass packaging lines. In an aspect, a method includes creating image data by imaging objects on the mass packaging line using an imaging device while the objects are exposed to a light and using a processor having memory associated therewith to process the image data to determine a characteristic of at least one of the objects. The objects are conveyed on the mass packaging line in a configuration other than a single file.

20 Claims, 11 Drawing Sheets

| Bit 8 | Bit 7 | Bit 6 | Bit 5 | Bit 4 | Bit 3 | Bit 2 | Bit 1 |
|---|---|---|---|---|---|---|---|
| Set | Line | Input Type | Defect Type | Location / Quantity | Location / Quantity | Location / Quantity | Location / Quantity |
| 1 | 1 | 0 | 0 | 1 | 1 | 0 | 1 |

| Bit 8 | Bit 7 | Bit 6 | Bit 5 | Bit 4 | Bit 3 | Bit 2 | Bit 1 |
|---|---|---|---|---|---|---|---|
| Set | Line | Input Type | Defect Type | Location / Quantity | Location / Quantity | Location / Quantity | Location / Quantity |
| 1 | 1 | 1 | 1 | 0 | 1 | 0 | 0 |

PACKAGING LINE MONITORING SYSTEMS AND METHODS

CROSS-REFERENCE TO RELATED APPLICATIONS

This application claims priority to U.S. Provisional Patent Application Ser. No. 63/378,432 filed Oct. 5, 2022, the disclosure of which is incorporated herein by reference in its entirety.

FIELD OF INVENTION

The field of the disclosure is computer vision for detecting object defects on a production line.

SUMMARY

Figure 1:
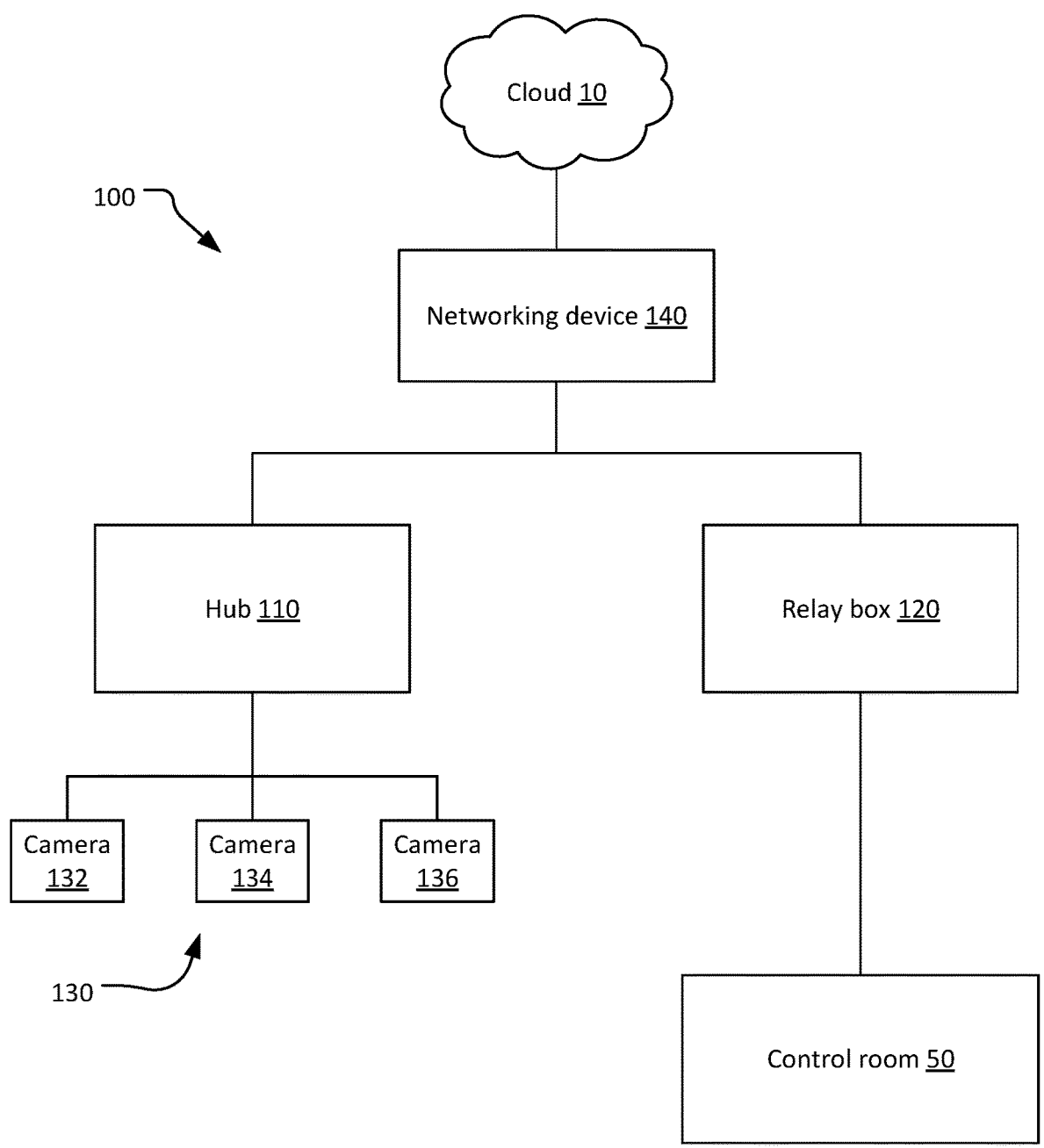
FIG. 1 is a schematic of a computer vision system, according to an embodiment of the disclosure.

In some aspects, the techniques described herein relate to a method of monitoring objects conveyed on a mass packaging line, the method including: associating an enclosure with the mass packaging line such that the objects on the mass packaging line travel through the enclosure; arranging at least one ultraviolet light with the enclosure; associating at least one imaging device with the enclosure; capturing image data using the imaging device while the objects pass through the enclosure on the mass packaging line and the ultraviolet light shines ultraviolet light onto the objects; using a processor having associated therewith a memory to process the image data to determine a characteristic of at least one of the objects; wherein, the objects are conveyed on the mass packaging line in a configuration other than a single file.

In some aspects, the techniques described herein relate to a method, further including configuring the enclosure to block at least some visible light.

In some aspects, the techniques described herein relate to a method, further including using the processor to divide the mass packaging line into a plurality of zones.

In some aspects, the techniques described herein relate to a method, further including communicating information about the image data using a relay.

In some aspects, the techniques described herein relate to a method, wherein the relay includes a plurality of switches and each of the plurality of switches has two positions.

In some aspects, the techniques described herein relate to a method, wherein determining the characteristic of at least one of the objects includes determining whether the at least one of the objects includes a coating.

In some aspects, the techniques described herein relate to a method, wherein the imaging device includes a plurality of imaging devices.

In some aspects, the techniques described herein relate to a method, further including training a machine learning model using training data to determine the characteristic of the at least one of the objects.

In some aspects, the techniques described herein relate to a method, further including dividing an imaging area of the at least one imaging device into an upstream tracking portion and a downstream counting portion.

In some aspects, the techniques described herein relate to a method, wherein the training data includes live data.

In some aspects, the techniques described herein relate to a method, further including using the imaging device to determine a defect in an object.

In some aspects, the techniques described herein relate to a method, wherein the defect includes one of a deformity and a defect in how the object is oriented.

In some aspects, the techniques described herein relate to a method, further including associating a second imaging device in an upstream section to monitor for a defective dead plate.

In some aspects, the techniques described herein relate to a method of monitoring objects conveyed on a mass packaging line, the method including: creating image data by imaging objects on the mass packaging line using an imaging device while the objects are exposed to a light; and using a processor having memory associated therewith to process the image data to determine a characteristic of at least one of the objects; wherein the objects are conveyed on the mass packaging line in a configuration other than a single file.

In some aspects, the techniques described herein relate to a method, wherein the light is an ultraviolet light.

In some aspects, the techniques described herein relate to a method, further including associating an enclosure with the mass packaging line.

In some aspects, the techniques described herein relate to a method, further including configuring the enclosure to block visible light.

In some aspects, the techniques described herein relate to a method, further including using a relay to communicate information associated with the image data.

In some aspects, the techniques described herein relate to a method, wherein the relay is operable to alter an operation of the mass packaging line based on the information.

In some aspects, the techniques described herein relate to a method of monitoring cans conveyed on a mass packaging line, the method including: associating an enclosure with the mass packaging line such that the cans on the mass packaging line travel through the enclosure; arranging at least one ultraviolet light with the enclosure; associating at least one imaging device with the enclosure; capturing image data using the imaging device while the cans pass through the enclosure on the mass packaging line and the ultraviolet light shines ultraviolet light onto the cans; and using a processor having associated therewith a memory to process the image data to determine a characteristic of at least one of the cans; wherein, the cans are conveyed on the mass packaging line in a configuration other than a single file.

DETAILED DESCRIPTION OF THE INVENTION

Computer vision techniques for detecting objects are known in the art. Computer vision systems typically comprise a computing system coupled to one or more imaging devices (e.g., photographic cameras, video cameras, etc.) which gather visual data from an area. The computing system can analyze the visual data for a large variety of applications. For instance, the computing system may use the visual data to identify objects within the given area. The gathered data may even be used to identify states, conditions, or characteristics of the detected objects.

One kind of computer vision system application is the monitoring of manufacturing systems or production lines. Conventional computer vision systems are used to monitor products one at a time as they undergo one or more manufacturing processes. These computer vision systems are generally used to detect faults or defects in the products, or otherwise detect incidences where several of the products are in an undesirable condition. For example, some conventional computer vision systems are used to detect when products are no longer traveling correctly along the production line (e.g., where one or more objects had fallen over, become misaligned, et cetera).

However, these conventional computer vision systems suffer from many drawbacks. For instance, conventional computer vision systems are extremely sensitive to environmental conditions, such as lighting and temperature. Other factors that can affect computer vision performance is machine wear or miscalibration. Changes in these conditions can prevent the computer vision systems from functioning properly. The computer vision systems can malfunction by producing false positive detections, misidentifying objects or defects, missing object detections altogether, et cetera. Environmental conditions vary drastically from one workplace to another, which often means that a conventional computer vision system that functions in one workplace may have significantly reduced efficacy in another workplace. In other words, conventional computer vision systems are rather inflexible and are not readily adaptable to new environmental conditions.

Furthermore, conventional computer vision systems are limited in detection capability. These systems lack the ability to make different kinds of object or object characteristic detections without having to rely on multiple imaging devices. This can unduly increase the cost and size of the conventional computer vision system when complex object detection is needed.

Conventional computer vision systems are generally limited in how many objects the system can effectively monitor at once. One problem with conventional vision or monitoring systems is that they are determinate with respect to object characteristics, such as the size, color, and type of object. These systems typically require that the input parameters be changed to match the object size, dimension, color, shape, et cetera, for the object being detected. For instance, a 6-inch red can may require different input parameters as compared to an 8-inch red can or a 6-inch blue can. Further, for detection and inspection of objects, these systems typically require static conditions, such as a fixed distance from the imaging device, a fixed focal length of the imaging device, et cetera. The conventional systems then assess the current image to a known (i.e., a "reference") image and assess the disparity or deviation between the measured object and the reference image.

Object and object defect detection becomes increasingly difficult as the number of objects in view of the imaging device increases. Not only is there a corresponding increase in computing power needed to process the higher number of objects in view, but the objects also tend to crowd each other and visually obscure themselves from the imaging device. Obscured objects may end up undetected by the conventional system, and defects in crowded objects are harder to recognize. Conventional computer vision systems attempt to mitigate issues associated with object crowding by specifically configuring or modifying the vision system to limit the number of objects in range of the imaging devices at any given time. Other methods of mitigating object crowding involve modifying the production line itself at great cost to accommodate the conventional computer vision systems.

Even when conventional computer vision systems function effectively, it is difficult to use the data generated/analyzed thereby to identify problems with or modify the operation of the production line. The conventional imaging devices typically capture a tremendous amount of photo/video data, which is difficult to store or transfer. These difficulties mean that the conventional systems are limited in their ability to respond in a timely manner to detections that are made. Furthermore, it is difficult to use this excessive data to identify a source or a pattern of a problem that is causing defects on the production line.

Given all these considerations, significant or even prohibitive cost/effort must be expended to implement conventional computer vision systems such that they would be of use. It is not uncommon for certain production lines to be incompatible with conventional computer vision systems, where the production lines would need large modifications to accommodate the conventional systems. Even so, the conventional computer vision systems may still be undesirable in situations where the production lines are compatible therewith. A significant loss of productivity is felt when those production lines are halted for computer vision system installation.

Embodiments of a computer vision system disclosed herein may solve the above discussed issues at least in part. In some examples of the disclosure, a singular machine learning model may be used to identify objects of different colors, sizes, and configurations. In an aspect of the disclosure, multiple dimensional representations of each object at varying distances may be provided to the model. The model may also be provided with multiple dimensional representations of defective objects in similar but different spatial orientations concurrently to build out an algorithmic model representation for the characteristics. As such, in some examples, a single process may be used to assess and determine multidimensional aspects for multidimensional objects, within a given image, without changing parameters specific to a particular object. Thus, a 6-inch red can, an 8-inch red can, a 6-inch blue can, et cetera, may be evaluated using the same model without having to change the input parameters as the same model may represent and account for each of these objects.

Figure 2:
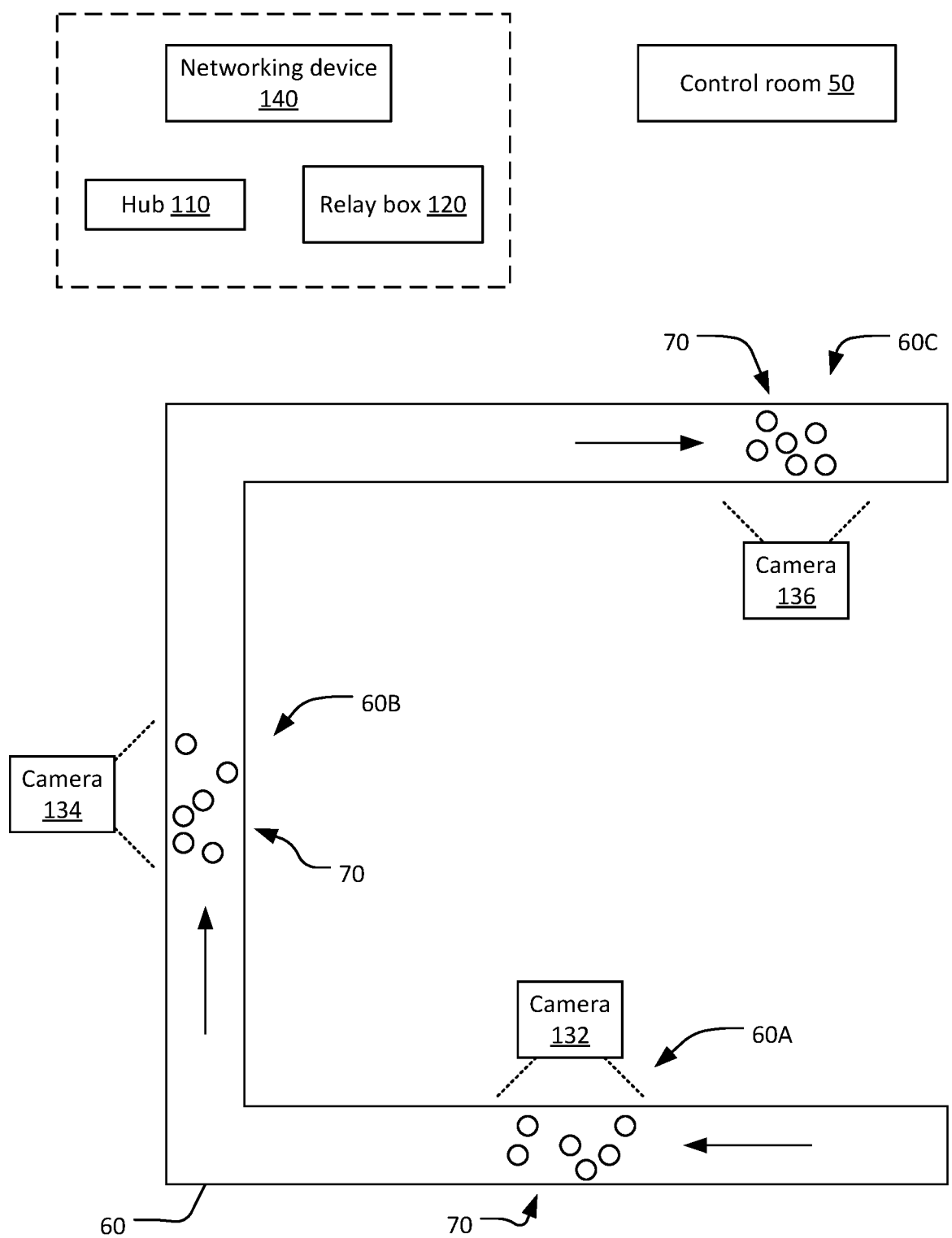
FIG. 2 is a schematic of the computer vision system of FIG. 1, employed on a production line.

Turning now to FIGS. 1 and 2, an embodiment 100 of a computer vision system is shown for use with a production line 60. The production line 60 may be any type of line (e.g., an automated or other conveyer belt, a filling line, et cetera) in a packaging or shipping facility. In some examples, the production line 60 may be a packaging line (i.e., a production line on which finished products are packaged to protect them during shipment and handling before use). The production line 60 may also provide a convenient surface to carry imprinted markings and codes that identify the product and enable regulators and purchasers to track its progress through shipping to the retailer or customer. The production line 60 may also be referred to herein as a "mass packaging line." One or more sections of the production line 60 may convey objects (e.g., cans, bottles, bags, et cetera) from one location to another en masse (i.e., in groups, as opposed to in one or more single files).

Aspects of the disclosure relate to monitoring and categorizing objects that are being conveyed on the production line 60 en masse, as opposed to in a single file or a plurality of single files. That is, aspects of the disclosure may relate to monitoring and categorizing defects in one or more objects that are being conveyed on the production line 60 in a random or other non-specific configuration (as opposed to in one or more single files). One having skill in the art will understand that monitoring objects that are being conveyed on the production line en masse may be more challenging than monitoring objects that are being orderly conveyed on the production line 60 in a single file or in multiple single files adjacent each other. Thus, the term "mass packaging line,", as used herein, refers to a line (e.g., a conveyer belt) or a section of the line on which the objects are being transported in a configuration other than a single file or a plurality or single files.

The computer vision system 100 may comprise a hub 110, a relay box 120, one or more imaging devices 130, and a networking device 140 communicatively coupled together (e.g., via wired and/or wireless connections). The hub 110 may further comprise a computing system 200 (FIG. 9), in embodiments. The computer vision system 100 may be used to monitor the production line 60 (FIG. 2). As discussed herein, the computer vision system 100, and specifically the cameras 132-136 thereof, may be arranged on, in, and/or proximate the line 60. Camera and/or imaging device, as used herein, may be a conventional camera (e.g., a conventional video camera, a conventional still camera, a mobile device such an Apple or Android device with an associated camera, et cetera), an infrared camera, an ultraviolet camera, or any suitable electromagnetic spectrum sensor or the like.

Each of the imaging devices 130 (e.g., cameras) may gather data from a portion of the production line 60 which the hub 110 may then analyze. The gathered data may be algorithmically analyzed to detect or identify one or more objects 70 (e.g., manufactured products or other similar items) that are on the production line 60. The gathered data may also be analyzed to determine one or more characteristics (e.g., a defect) of the detected objects 70. For instance, a state, characteristic, and/or condition of each of the detected objects 70 may be assessed. In embodiments, the computer vision system 100 may effectuate actions in response to the object 70 and/or object 70 characteristic detections. Actions effectuated by the computer vision system 100 may comprise generating an alert, formulating an incident report, or modifying the operation of the production line 60, et cetera.

The computer vision system 100 may be a modular, flexible system in that the system 100 may be readily adapted to disparate computer vision applications. FIG. 2 depicts an example computer vison system 100 layout, where the system 100 has a plurality of cameras as imaging devices 130 set up along a production line 60. The production line 60 may be, for example, a conveyor belt which transports objects 70, such as metal cans, from one location to another. The objects 70 may undergo various manufacturing processes along the way. Here, the computer vision system 100 has three imaging devices 130 to monitor the objects 70 on the line 60: a first camera 132 at a first production line location 60A, the first camera 132 being upstream a second camera 134 at a second production line location 60B, the second camera 134 itself being upstream a third camera 136 at a third production line location 60C. Each of the cameras 132, 134, and 136 may independently generate object 70 detections, which the hub 110 (e.g., the computing system 200 thereof) may analyze, and which the relay box 120 may produce outputs in response to. While the components of the computer vision system 100 may appear remote from each other in FIG. 2, one or more of the system 100 components may be communicatively coupled via the networking device 140 or other suitable wired/wireless connections.

Figure 3:
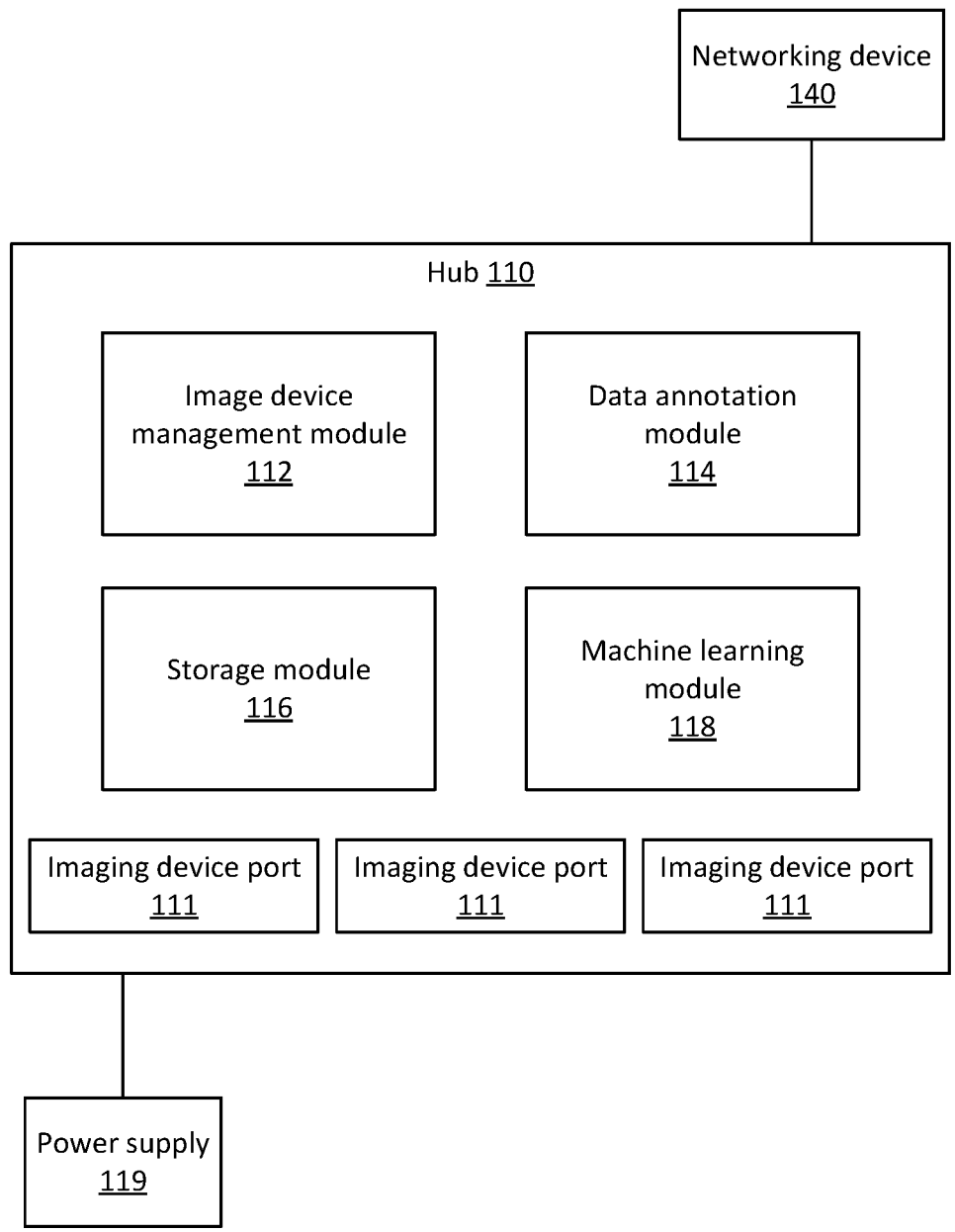
FIG. 3 is a schematic of a hub of the computer vision system of FIG. 1.

FIG. 3 shows a schematic diagram of an example hub 110. The hub 110 may comprise imaging device ports 111, an imaging device management module 112, an annotating module 114, a storage module 116, and a machine learning module 118. The artisan would understand that the hub 110 may alternatively or additionally include the computing system 200 or a like computer or other processing device. The hub 110 may be coupled to a power supply 119 which may be an internal supply (e.g., batteries) and/or an external supply (e.g., a wall outlet). The imaging device ports 111 may be dataports which are configured to communicatively couple the hub 110 to the one or more imaging devices 130, and the hub 110 may have as many ports 111 as desired to accomplish a computer vision task. The image device management module 112 may be used to adjust or otherwise modify performance of the plurality of imaging devices 130. The management module 112 may take information generated by the method 400 (FIG. 10) into account when making these adjustments, as discussed in further detail below.

The data annotation module 114 may be a module configured to receive and interact with image data captured from the imaging devices 130. The annotation module 114 may interact with the captured data by marking and categorizing portions of the data (e.g., the objects 70 and the defects thereof). These annotations may be used for data analysis and to refine a machine learning program 300 (FIG. 10) of the computer vision system 100, as discussed in greater detail below.

The storage module 116 may be any suitable type of storage device or combination of storage devices for holding data. The data held may be, for example, image data gathered by the imaging devices 130. While the data may be uploaded to a cloud 10 (FIG. 1) in some embodiments, other embodiments may store data locally in the storage module 116 or storage devices proximate the hub 110 or remote therefrom. In a currently preferred embodiment, the data may be stored in the storage module 116 and the storage module 116 may be walled off from the internet or other networks. In this manner, the data captured by the imaging devices 130 may effectively be "air-gapped" and made unreachable by a network security breach that would threaten conventional systems.

The machine learning module 118 may store the machine learning program 300 of the system 100. In embodiments, there is a unique program 300 for each of the imaging devices 130. More details of program 300 functions are detailed below and in FIG. 10, and the machine learning module 118 may be configured to execute these programs 300. In some embodiments, the machine learning module 118 may modify the programs 300 such as by updating the program 300 to reflect newly collected data or other parameters of the production line 60.

Figure 4:
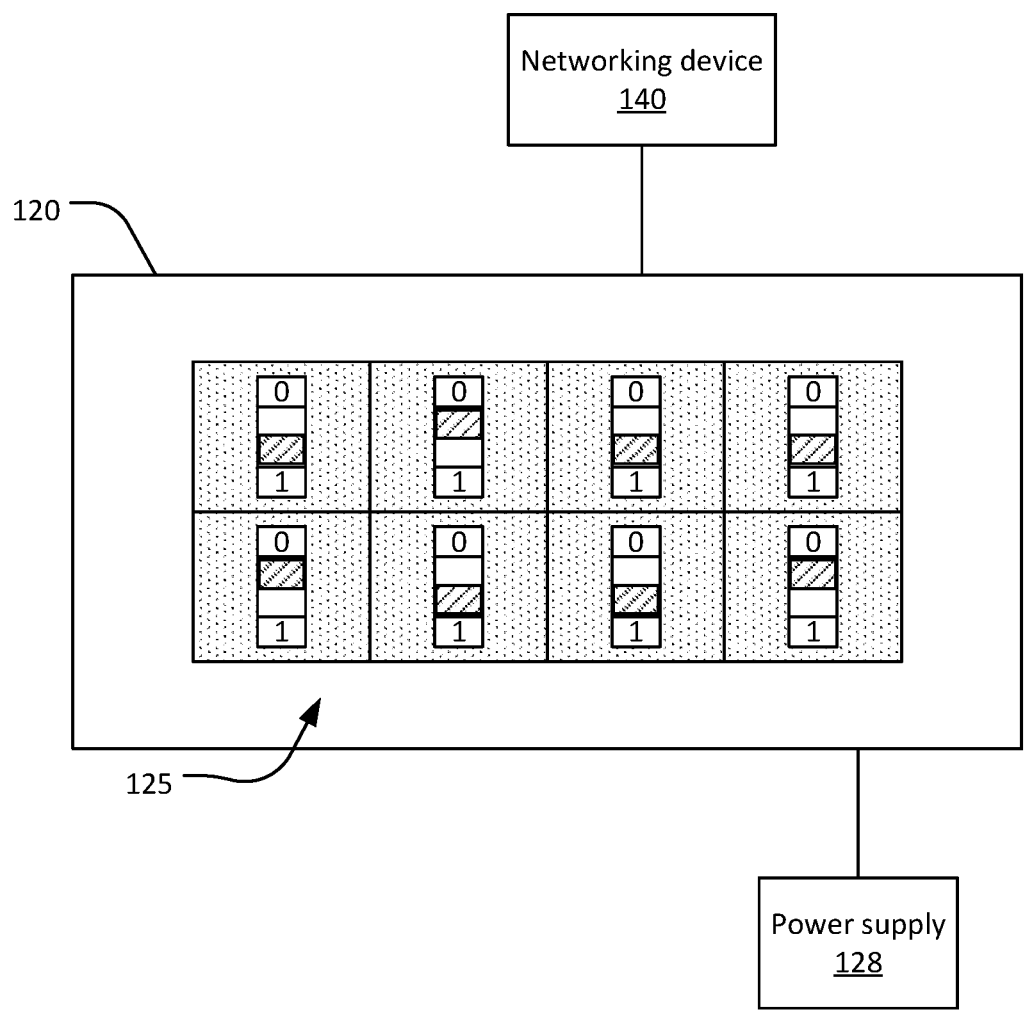
FIG. 4 is a schematic of a relay box of the computer vision system of FIG. 1.

FIG. 4 depicts a relay box 120 layout, according to an embodiment. The relay box 120 may house a plurality of relay switches 125, and the box 120 may be linked to other components of the system 100 via the networking device 140. The relay box 120 may be coupled to a power supply 128 which may be an internal supply (e.g., batteries) and/or an external supply (e.g., a wall outlet). The relay switches 125 may each be selectively changeable between an "off" and an "on" position which may be used to represent bits of data (e.g., each relay switch 125 may represent or produce a single bit). The system 100 may extract and transmit imaging device 130 detection information using the relays 125, as discussed further below. In short, the relay box 120 may transduce imaging information captured/analyzed by the imaging devices 130 and/or the hub 110. The relay switches 125 may take this information and convert it from a digital form to a simplified analog form. The transduced analog data may take up significantly less space than the unconverted digital data produced by the system 100 and may likewise be relatively easier to transmit, receive, and interpret.

In embodiments, the outputs of relays 125 may be used to modify performance of the production line 60. For example, the relay 125 analog signal may be routed to a control 50 room (FIGS. 1 and 2) of the production line 60 so that action may be taken in response to the data provided by the relays 125. In further embodiments, the system 100 may include another relay box 120, similar in function to the first relay box 120, except that this other relay box 120 may function as an input device for the system 100, rather than an output device. For instance, an input relay box 120 may receive some external signal, transduce said external signal to an analog signal using the relays 125, and then route that converted signal to the hub 110 (e.g., the computing system 200 thereof). A relay box 120 used to provide inputs for the system 100 may facilitate interfacing with the system 100 and optimizing same for a given application.

Figure 5:
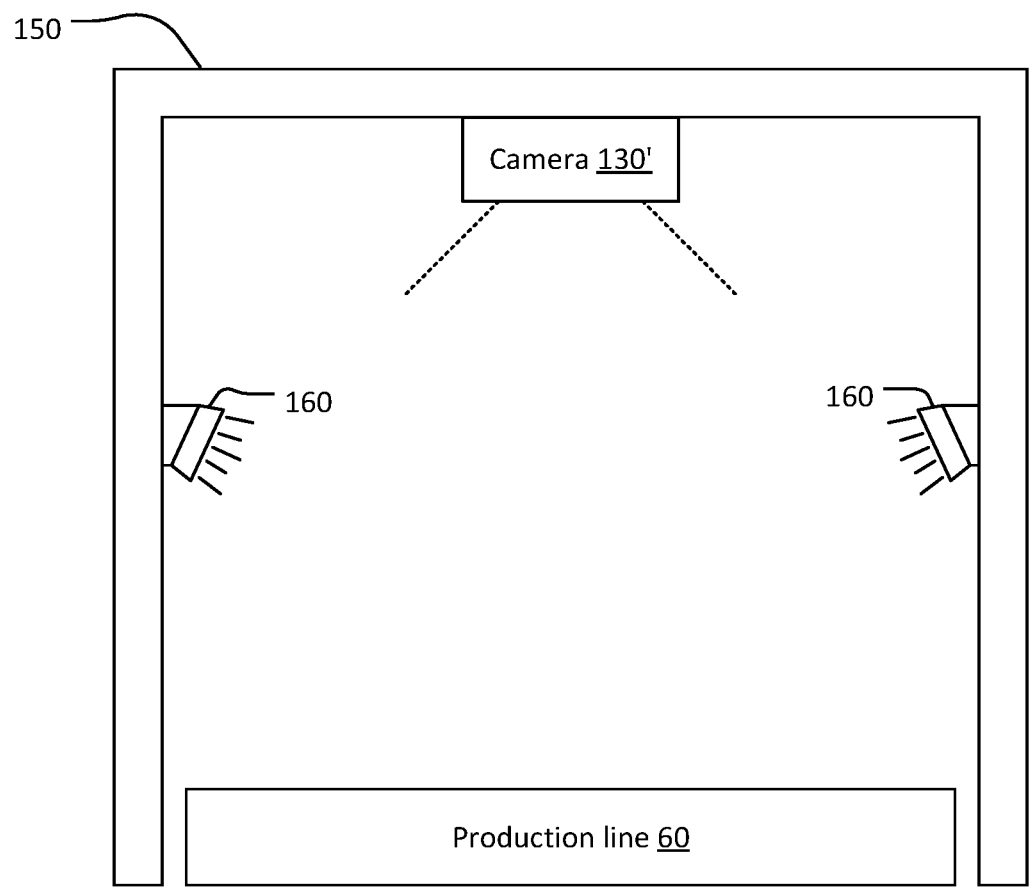
FIG. 5 is a schematic of an enclosure of the computer vision system of FIG. 1, employed on the production line.

In an embodiment, the machine vision system 100 may have associated therewith an enclosure 150 (FIG. 5). The enclosure 150 may be, for example, arranged on the production line 60 such that the objects 70 may pass therethrough. The enclosure 150 may house one or more imaging devices 130' that, like the imaging devices 130, may capture data from objects 70 which pass in range. One or more ultraviolet (UV) lights 160 may be arranged within the enclosure 150 to illuminate objects 70 within. The camera 130' may detect certain features or characteristics of the objects 70 which would be difficult or even impossible to detect with normal light sources. For example, certain coatings applied to object 70 (e.g., a soda or beer can) may reflect or absorb UV light in a particular way. In operation, the camera 130' housed in enclosure 150 may detect object 70 discrepancies using the UV light from the lights 160. To facilitate this function, the enclosure 150 may be configured such that intrusion from regular light is eliminated or at least mitigated. One method of achieving this is to configure the enclosure 150 such that the enclosure 150 may envelop the production line 60 to stop visible light from entering the enclosure 150 interior. In some embodiments, the enclosure 150 may further comprise a coating (e.g., paint, foil, etc.) which absorbs or reflects unwanted visible light. Despite the need for light sources 160 used to capture data, the camera 130' may still function much like the imaging devices 130 when effectuating the methods and processes described herein.

FIGS. 6A and 6B, FIGS. 7A and 7B, and FIGS. 8A and 8B depict example scenarios of object 70 detection, object 70 defect detection, and object 70 incident detection, respectively, as well as the relay box 120 switch 125 output positions 125P, 125P', 125P'' that correspond thereto. The artisan would understand that the scenarios depicted in these figures are intended to illustrate example functionality of the computer vision system embodiments disclosed herein, and that these examples do not limit the scope of the disclosure.

Figures 6A, 6B:
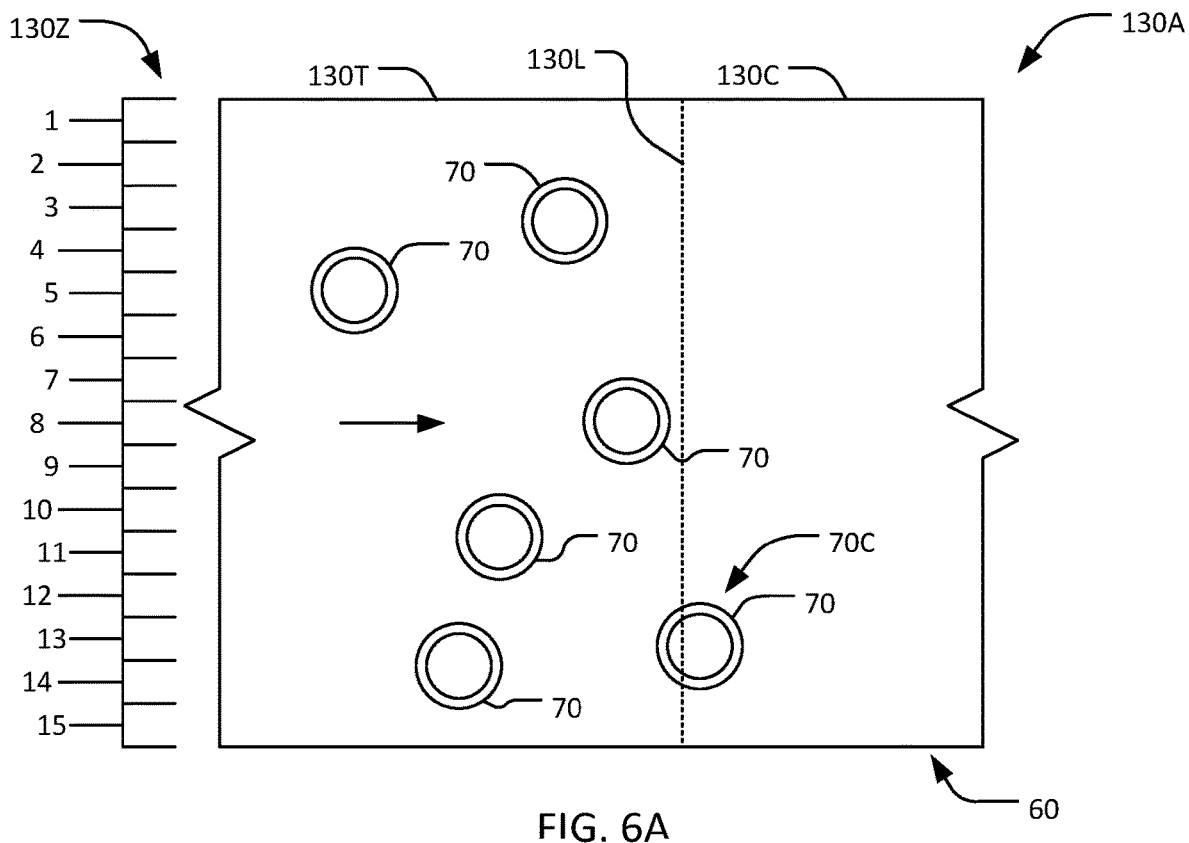
FIG. 6A is a schematic showing a detection scenario of the computer vision system of FIG. 1, according to an embodiment.
FIG. 6B is a schematic showing a relay switch position of the computer vision system detection scenario of FIG. 6A.
Figures 7A, 7B:
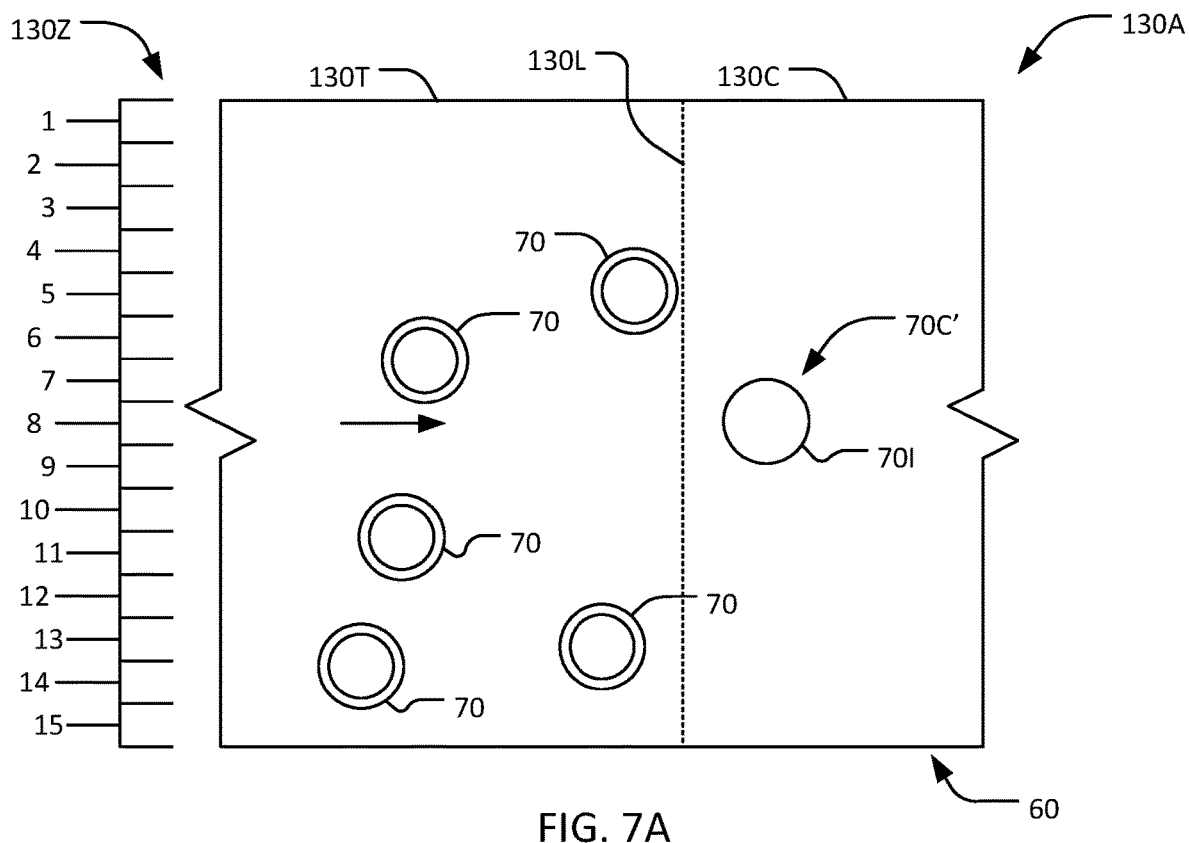
FIG. 7A is a schematic showing a detection scenario of the computer vision system of FIG. 1, according to another embodiment.
FIG. 7B is a schematic showing a relay switch position of the computer vision system detection scenario of FIG. 7A.
Figures 8A, 8B:
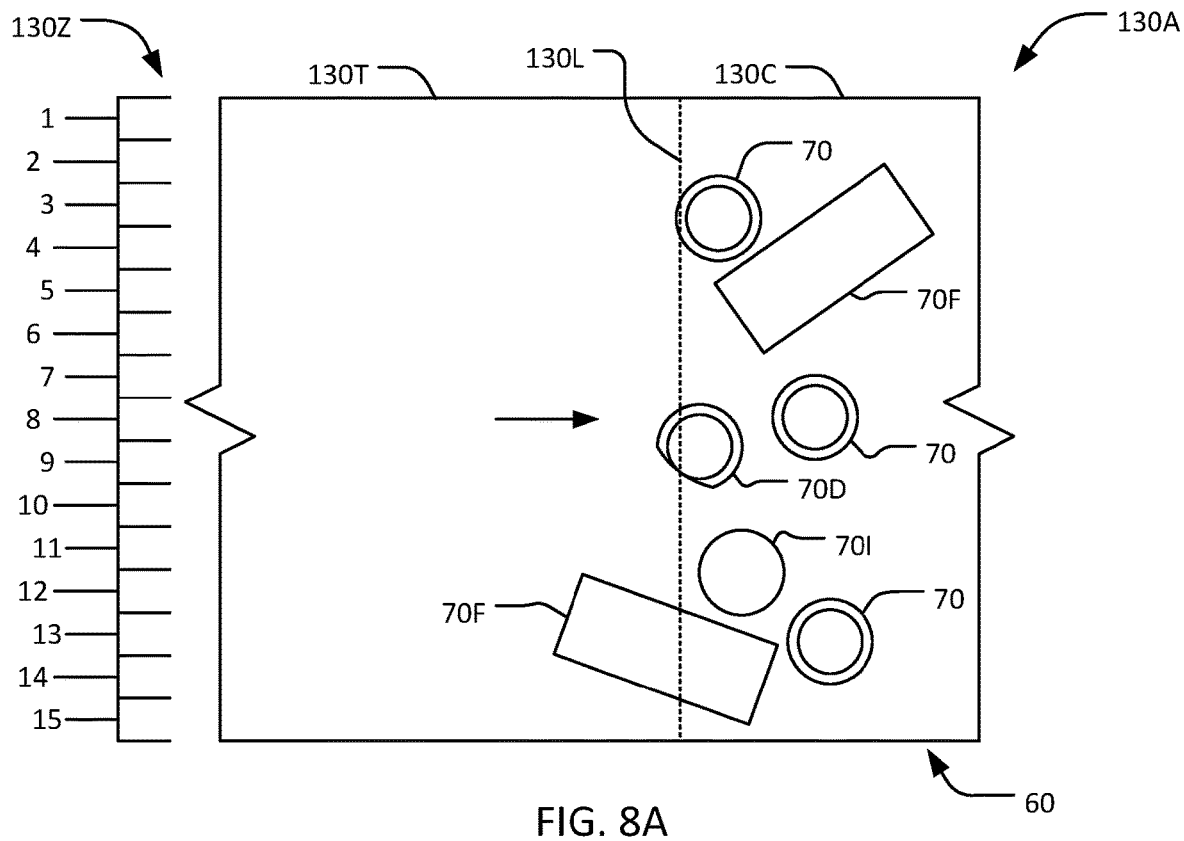
FIG. 8A is a schematic showing a detection scenario of the computer vision system of FIG. 1, according to yet another embodiment.
FIG. 8B is a schematic showing a relay switch position of the computer vision system detection scenario of FIG. 8A.

Each of the FIGS. 6A, 7A, and 8A show a type of object 70 detection. The kind of object 70 detections made, and the corresponding relay 125 reports thereof, is what distinguishes these three examples from each other. However, each of FIGS. 6A, 7A, and 8A are similar in that they show a top-down view of a viewing area 130A of one imaging device 130. The viewing area 130A may be a portion of the production line 60 which is in sensing range of the imaging device 130. Here, the objects 70 (e.g., open topped cans, soda cans, glass, plastic or other bottles, pallets, packages, or other containers) may travel along the production line 60 (e.g., from left to right) as the imaging device 130 and the computing system 200 implement machine learning analysis (e.g., via machine learning program 300) (FIG. 10) thereupon. The objects 70 may be oriented differently (e.g., neck up as opposed to bottom up, or cut edge up as opposed to bottom up, et cetera). Each object 70 first passes into a tracking portion 130T of the viewing area 130A before traveling into a counting portion 130C of the viewing area 130A. The imaging device 130 may begin identification/detection of objects 70 that enter the tracking portion 130T, but detections may not yet be reported or counted. The imaging device 130 and the computing system 200 may use the time the object 70 takes to traverse the tracking portion 130T to build up a confidence coefficient 330 (FIG. 10) on the object 70 and any condition, status, or characteristic thereof. After the object 70 crosses a threshold line 130L into the counting portion 130C of the viewing area 130A, the system 100 may be enabled to report detections on that object 70 if those detections have a sufficiently high confidence coefficient 330. A width of the production line 60 may be divided into a plurality of zones 130Z (e.g., fifteen even zones) which may be used to identify a location of an object 70 on the production line 60. In some examples, the same machine learning model may be configured to differentiate between different types of objects (e.g., cans of different sizes and/or colors) and may differentiate between the same type of object based on orientation (e.g., differentiate between two identical cans where one is situated neck up and the other is situated neck down). In some non-limiting examples, the same machine learning model may be trained using the presentation of: an object oriented in different ways; the object, as it appears with other identical objects; the object, as it appears with other types of objects (e.g., the object as it appears with other objects having a different size, color, or orientation); and, the object, as it appears with defective objects of the same type or a different type. By training the model to discern how the object is presented in a variety of scenarios, a multi-dimensional model with the capacity to interpret conditional states of objects in differing presentations may be created. In some examples, images may be taken from a singular perspective or orientation and these images may be comparatively assessed as the conditions associated with the object change (e.g., as the object moves further away, as the lighting conditions change, as the object orientation changes, as the object trajectory changes, et cetera).

In embodiments, the machine learning model may further include false positive filtering. For example, false positives may be discarded during the counting process where the surrounding information indicates the count is likely to be invalid (e.g., a double count).

In an embodiment, the false positives, in lieu of being discarded, may be stored (e.g., in a separate database). These false positives may be tracked and analyzed. In embodiments, such processing may allow for the false positives to be re-run through the system as the algorithms and data points are fine-tuned over time. These "false positives" may then be added back to the timestream. Such may allow the system to adjust its noise floor and retroactive add back real data that was filtered out previously.

FIGS. 6B, 7B, and 8B show example relay 125 output positions 125P, 125P', and 125P'', respectively. When an object 70 detection is made, the relay 125 may be manipulated (e.g., by the computing system 200) into an output position which details one or more characteristics of the object 70 detection. Specifically, one or more binary switches of the relay 125 may be manipulated in accordance with the particular object 70 detection made. Object 70 characteristics that can be conveyed with the relay 125 may be, for example, whether the object 70 has a defect, what type or types of defects the object 70 has, a relative position of the object 70 on the production line 60, and other similar characteristics. It may be advantageous to convey information using the relay 125 this way since the relay 125 may transmit analog data packages that are significantly smaller than digital image or video data packages. In short, the relay 125 may be used to translate or convert the gathered object 70 visual information into a space efficient form which may be easily transmitted and interpreted. It is noted here that this data translation/conversion is distinct from conventional data compression since the relay 125 may create a unique data set of key components extracted from the gathered digital visual information. This is opposed to conventional data compression which merely uses compression techniques to transform the originally gathered information into a more compact form.

In embodiments, the relay 125 may comprise eight bits, each of which may be selectively actuated between a first position and a second position (e.g., switchable between an "off" or "0" state, and an "on" or "1" state). Each of these eight bits may convey a piece of information corresponding to characteristics of the object 70 detection. For example, bit number eight may convey whether the relay 125b is gathering data or not. Bit number seven may identify at what location and/or from which imaging device 130 the data is being collected from along the production line 60 (e.g., a "1" here may indicate the data is being collected from the first camera 132 at the first production line location 60A, and a "0" here may indicate the data is being collected from the second camera 134 at the second production line location 60B) (FIG. 2). Bit number six may identify what kind of detection was made. For example, bit number six may be used to indicate the presence, or absence, of detected defects of object 70C. Alternatively or additionally, bit number six may be used to indicate that an "incident" had occurred, such as depicted in FIG. 8A, where the imaging device 130 had found a plurality of objects 70 with defects in the viewing area 130A. Widespread object 70 defects generally indicate more serious issues with production line 60 operation than simple machine or human error, thus these incident detections may warrant special categorization or consideration.

Bit number five may identify the type of defect found with the object 70 where it is applicable (e.g., a "1" here may indicate the object 70 suffers from a "fallen" or "down" defect where the object 70 has fallen over or is otherwise oriented the wrong way, and a "0" here may indicate the object 70 suffers from a "dented" defect where a surface of the object 70 is deformed beyond desired tolerances). The remaining bit numbers four, three, two, and one may be collectively used to indicate a location of the detected object 70C or a quantity of objects 70 having defects in a given incident, where applicable. If a single object 70C is detected, regardless of the presence of defects, then bit numbers four, three, two, and one may be used to indicate a position of the detected object 70C along one axis of the line 60. This may be accomplished by, for example, dividing the viewing area 130A into a plurality of equally sized zones 130Z, where each zone 130Z is assigned a number. Then, bit numbers four through one may use a base two (otherwise known as a "binary") counting system to indicate which numbered zone 130Z the object 70C lies in. In the scenarios depicted in FIGS. 6A, 7A, and 8A, a width of the line 60 is divided into fifteen equal zones 130Z since there are four bits to represent the object 70C location (i.e., bit number four represents the "eight's" place, bit number three represents the "four's" place, bit number two represents the "two's" place, and bit number one represents the "one's" place). Bit numbers four, three, two, and one may each be selectively toggled to arrive at any of the numbers one through fifteen to indicate which zone 130Z the detected object 70C resides in. If instead an incident or multiple defective objects 70 are detected, the base two system of bit numbers four, three, two, and one may instead be used to indicate the number of defective objects 70 found, rather than a location. In operation, the relay 125 may use these eight bits to extract critical information about the detected objects 70C, without the undue burden of massive data file sizes normally associated with conventional images.

FIG. 6A shows an imaging area 130A where a detected object 70C having no detected defects has crossed the threshold line 130L. If it is determined that the object 70C has a high enough confidence coefficient 330 associated therewith, then the object 70C detection may be reported via the relay 125. FIG. 6B depicts the eight-bit relay 125 output positions 125P corresponding to the object 70C detection of FIG. 6A. In this scenario, the relay 125 output position 125P translates as follows: the "1" of bit number eight indicates that the data set is being filled, the "1" of bit number seven indicates that the object detection 70C occurred at the first camera 132 viewing area 130A, the "0" of bit number six indicates that the number of defects of interest is zero, the "0" of bit number five indicates that the object 70C was not found to have defects, and the conglomerate "1101" of bits four, three, two, and one indicates the detected object 70C was located in zone 130Z (e.g., zone thirteen) of the production line 60.

FIG. 7A shows an imaging area 130A where a detected object 70C' having a detected defect has crossed the threshold line 130L. If it is determined that the object 70C has a high enough confidence coefficient 330 associated therewith, then the object 70C' detection may be reported via the relay 125. FIG. 7B depicts the eight-bit relay 125 output positions 125P' corresponding to the object 70C' detection of FIG. 7A. In this scenario, the relay 125 output position 125P' translates as follows: the "1" of bit number eight indicates that the data set is being filled, the "1" of bit number seven indicates that the object detection 70C occurred at the first camera 132 viewing area 130A, the "0" of bit number six indicates that no incident of defects were found, the "1" of bit number five indicates the detected object 70C was found to be an inverted object 70I where the object 70C was oriented the wrong way, and the conglomerate "1000" of bits four, three, two, and one indicates the detected object 70C was located in zone 130Z (e.g., zone eight) of the production line 60.

FIG. 8A shows an imaging area 130A where an incident occurred and multiple defective objects 70 were detected. If it is determined that these detections have a high enough confidence coefficient 330 associated therewith, then the incident detection may be reported via the relay 125. FIG. 8B depicts the eight-bit relay 125 output positions 125P''' corresponding to the incident detection of FIG. 8A. In this scenario, the relay 125 output position 125P''' translates as follows: the "1" of bit number eight indicates that the data set is being filled, the "1" of bit number seven indicates that the incident detection occurred at the first camera 132 viewing area 130A, the "1" of bit number six indicates that an incident was detected and a plurality of defective objects 70 were found, the "1" of bit number five indicates one of the defects was found to be an inverted object 70I where the object 70C was oriented the wrong way (other defects of note are the fallen objects 70F which had tipped over and the deformed object 70D), and the conglomerate "0100" of bits four, three, two, and one indicates the detected incident comprised four defective objects 70.

The artisan will understand that these are mere examples. In embodiments, different relays may be used for different types of monitoring. For example, one relay may be used to convey information about the object count, another relay may be used for conveying information about dented objects, yet another relay may be used for conveying information about misaligned (e.g., upside down) objects, et cetera. In other embodiments still, one relay may be used to convey information related to object count and dent detection, another relay may be used to convey information about misaligned objects, and so on.

Figure 9:
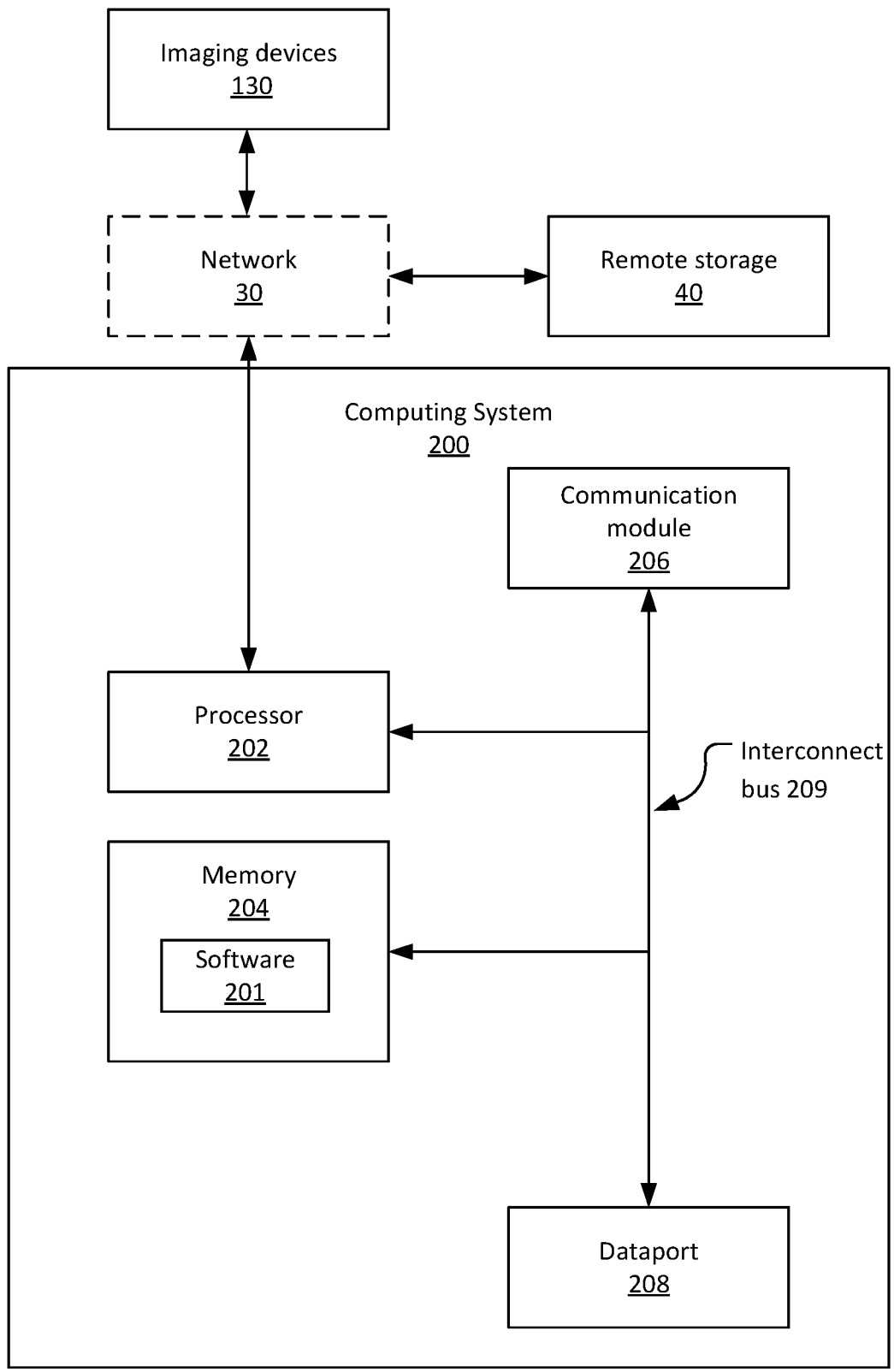
FIG. 9 is a schematic showing a computing system of the computer vision system of FIG. 1, according to an embodiment.

FIG. 9 is a functional block diagram of the computing system 200 which may be used to implement the various computer vision system embodiments and methods according to the different aspects of the present disclosure. The computing system 200 may be, for example, a smartphone, a laptop computer, a desktop computer, a flexible circuit board, or other computing device whether now known or subsequently developed. The computing system 200 may comprise a processor 202, the memory 204, a communication module 206, and a dataport 208. These components may be communicatively coupled together by an interconnect bus 209. The computing system 200 may be interacted with and/or located at, in embodiments, the hub 110. Alternatively, or additionally, the computing system 200 may be interacted with and/or located at a disparate location from the hub 110 (e.g., interacted with by a personal computer over a network).

The processor 202 may include any processor used in smartphones and/or other computing devices, including an analog processor (e.g., a Nano carbon-based processor). In certain embodiments, the processor 202 may include one or more other processors, such as one or more microprocessors, and/or one or more supplementary co-processors, such as math co-processors.

The memory 204 may include both operating memory, such as random-access memory (RAM), as well as data storage, such as read-only memory (ROM), hard drives, optical, flash memory, solid state, or any other suitable memory/storage element. The memory 204 may include removable memory elements, such as a CompactFlash card, a MultiMediaCard (MMC), and/or a Secure Digital (SD) card. In certain embodiments, the memory 204 includes a combination of magnetic, optical, and/or semiconductor memory, and may include, for example, RAM, ROM, flash drive, solid state, and/or a hard disk or drive. The processor 202 and the memory 204 each may be located entirely within a single device or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 202 may be connected to the memory 204 via the dataport 208.

The communication module 206 may be configured to handle communication links between the computing system 200 and other external devices or receivers, and to route incoming/outgoing data appropriately. For example, inbound data from the dataport 208 may be routed through the communication module 206 before being directed to the processor 202, and outbound data from the processor 202 may be routed through the communication module 206 before being directed to the dataport 208. The communication module 206 may include one or more transceiver modules configured for transmitting and receiving data, and using, for example, one or more protocols and/or technologies, such as GSM, UMTS (3 GSM), IS-95 (CDMA one), IS-2000 (CDMA 2000), LTE, FDMA, TDMA, W-CDMA, CDMA, OFDMA, Wi-Fi, WiMAX, 5G, or any other protocol and/or technology. The communication module 206 may, in embodiments, communicatively couple the computing system 200 to the relay box 120, the imaging devices 130, the networking device 140, a device of the production line 60, and/or the control room 50.

The dataport 208 may be any type of connector used for physically interfacing with a smartphone, computer, and/or other devices, such as a mini-USB port or an IPHONE®/IPOD® 30-pin connector or LIGHTNING® connector. In other embodiments, the dataport 208 may include multiple communication channels for simultaneous communication with, for example, other processors, servers, and/or client terminals. In some embodiments, such as one where the computing system 200 is at least partially housed within the hub 110, the dataports 208 may comprise one or more Power over Ethernet (PoE) ports for interfacing with PoE compatible imaging devices 130.

The memory 204 may store instructions for communicating with other systems, such as a computer. The memory 204 may store, for example, a program (e.g., computer program code) adapted to direct the processor 202 in accordance with the embodiments described herein. The instructions also may include program elements, such as an operating system. While execution of sequences of instructions in the program causes the processor 202 to perform the process steps and/or functions described herein, hard-wired circuitry may be used in place of, or in combination with, software/firmware instructions for implementation of the processes of the present embodiments. Thus, unless expressly noted, the present embodiments are not limited to any specific combination of hardware and software.

In embodiments, the memory 204 includes software 201. The software 201 may contain machine-readable instructions configured to be executed by the processor 202. The software 201 may, for example, process data obtained from the imaging devices 130. In embodiments, the software 201 may cause the computing system 200 to dynamically respond to a reading made by the imaging devices 130. For example, the software 201 may generate an alert in response to an imaging device 130 incident detection where a predetermined threshold of object 70 defect detections was reached.

In embodiments, the memory 204 may contain a machine learning system or program configured to carry out one or more of the techniques and methods described herein. As an example, a machine learning program may be used by the computing system 200 to adapt to various operating and/or environmental conditions of the system 100. The machine learning analysis may be provided on behalf of any number of machine learning algorithms and training models, including but not limited to deep learning models (also known as deep machine learning, or hierarchical models) that have been trained to perform image recognition tasks. Machine learning is used to refer to the various classes of artificial intelligence algorithms and algorithm-driven approaches that can perform machine-driven (e.g., computer-aided) identification of trained structures, and deep learning is used to refer to a multiple-level operation of such machine learning algorithms using multiple levels of representation and abstraction. The artisan will understand that the role of the machine learning algorithms that are applied, used, and configured as described may be supplemented or otherwise carried out by any number of other algorithm-based approaches, including variations of artificial neural networks, learning-capable algorithms, trainable object classifications, and other artificial intelligence processing techniques, as discussed in greater detail below.

The computing system 200 may be in data communication with a remote storage 40 and/or a "cloud" storage system 10 over a network 30. The network 30 may be a wired network, a wireless network, or comprise elements of both. In embodiments, the network 30 may communicatively link one or more components of the computer vision system 100 (e.g., via the networking device 140). For example, the imaging devices 130 may be communicatively linked to the computing system 200 via the network 30 for the exchange of information therebetween. The remote storage 40 may be, for example, the "cloud" or other remote storage in communication with other computing systems. In embodiments, data (e.g., readings obtained by the imaging devices 130, the dynamic responses of the computing system 200 with respect to the obtained readings, the analysis performed on the obtained readings by the computing system 200, etc.) may be stored in the remote storage 40 for analytics.

Figure 10:
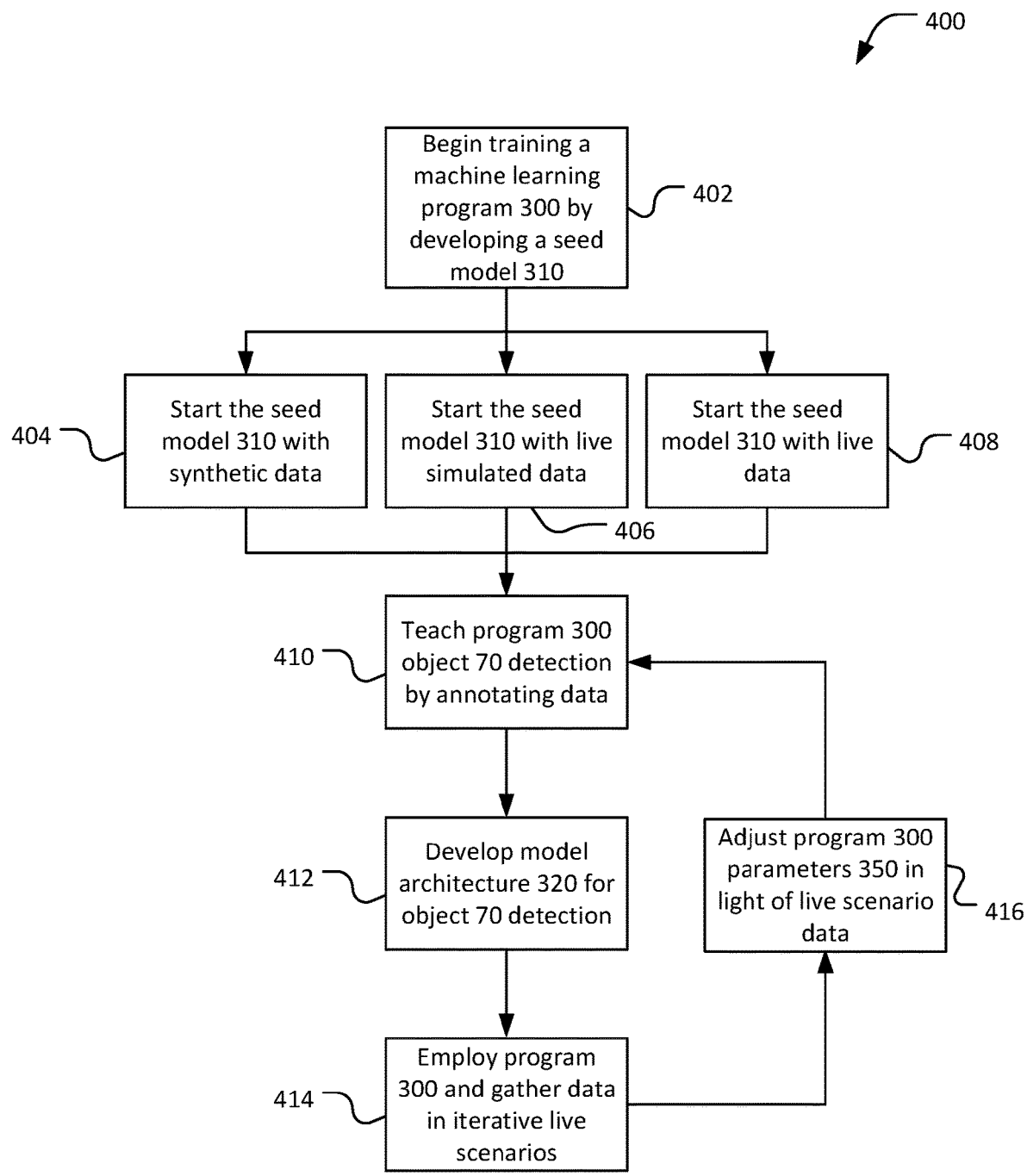
FIG. 10 is a flowchart depicting a method of operating a machine learning program of the computer vision system of FIG. 1, according to an embodiment.

In embodiments, the memory 204 may contain a machine learning program 300 trained, for example, by a method 400, shown in the flowchart of FIG. 10. As discussed above, one computer vision application is often much different from another. The algorithm or program used to detect/identify objects 70 and misalignments and/or defects thereof in each computer application may likewise vary (e.g., based on the object being monitored, the size and speed of the line, the expected count, et cetera). To adapt to a given computer vision task, the machine learning program 300 must be trained to identify both objects 70 and the possible defects.

Focus is directed to FIG. 10. The program 300 may begin as a seed model 310, at step 402. The seed model 310 may be a starting point so that the system 100 may be introduced to the objects 70, and the relevant characteristics thereof, the program 300 is to detect. The seed model 310 may be developed through one of, or a combination of, a synthetic model, a live simulated model, and a live data model. The seed model 310 may be developed or trained in the same way with any one of these three methods. The differences between these models reside in how the data is generated in each. Developing the seed model 310 with synthetic data (at step 404) may include training the program 300 with computer and/or user generated images. Developing the seed model 310 with live simulated data (step 406) may involve training the program 300 by manually passing objects 70 in the view of imaging devices 130 installed on the line 60. Developing the seed model 310 with live data (step 408) may involve training the program 300 with actual data gathered from the production line 60. Objects 70 shown in the live simulated model and in the synthetic model may be deliberately inflicted with one or more defects so that the program 300 may learn what those may look like in a live environment. Whatever the model used, the data (e.g., each frame or picture thereof) may be annotated by a user at step 410 (e.g., the user may identify a particular image frame as having a dented object, another image frame as having a misaligned object, another image frame as having an object devoid of any defects, et cetera). This process may indicate to the program 300 what the objects 70 and various statuses, conditions, characteristics, and/or defects thereof look like for future identification.

Having been given these annotations, the program 300 may then develop a model architecture 320, at step 412, which may be able to view new data (e.g., images, video) and assign confidence scores 330 to objects 70 (and object 70 characteristics) that lie in frame. The model architecture 320 may allow the program 300 to identify objects 70 which the program 300 had not exactly seen before, such as when the program 300 had only seen similar objects 70. Higher confidence scores 330 may be assigned to objects 70 and object 70 characteristics the program 300 can readily identify by extrapolating the data already seen by the program 300. Lower confidence scores 330 may be assigned to objects 70 and object 70 characteristics that the program 300, for example, has not seen before or otherwise cannot discern given the data the program 300 has previously encountered. When confidence scores 330 are high enough to reach a confidence threshold 340 (e.g., a predetermined threshold set by a user), the program 300 may generate an object 70 or object 70 characteristic detection.

In some embodiments, the program 300 may identify problematic areas of the production line 60. For example, where the object detection by the imagers 130 indicates that a particular area of the production line 60 is regularly associated with one or more defects in the objects 70 (e.g., upside down cans, dented cans, and/or other defects), the program 300 may indicate same to an operator. Such may apprise the operator that there may be an issue with an upstream portion of the production line 60. For example, an upstream portion of the production line 60 may have a defective dead plate (e.g., a dirty dead plate, an inclined dead plate, et cetera), a defective machine, or some other issue causing defects in objects. Where the defects are found in objects 70 only in a subset of zones of the production line 60 (e.g., where the production line 60 is divided into five zones but only objects in zone 3 routinely have defects), such may indicate to an operator that an upstream dead plate, machine, et cetera, associated with zone 3 of the production line 60 needs to be serviced or otherwise addressed. The operator may therefore address any problems with a portion of the production line 60 based on defects that are determined in objects downstream that portion.

While the system 100 is employed in a computer vision application, live data (e.g., object 70 detections, object 70 characteristic detections, environmental conditions, etc.) may be collected. These live scenarios typically reveal scenarios on which the system was not appropriately trained by the seed model 310. For example, the live scenarios may reveal that undesirable environmental lighting conditions around a given imaging device 130 were preventing the system 100 from making accurate object 70 or object 70 characteristic detections. As another example, the live scenarios may reveal a kind of object 70 defect that was not originally known, anticipated, or otherwise trained for.

The live scenario data may be used, at step 416, to adjust parameters 350 of the program 300. For example, parameters 350 may be adjusted accordingly in situations where it is determined that the environment is over- or under-lit. As another example, it may be found that objects 70 are too densely packed for the imaging device 130 to make accurate detections, and so a resolution of the imaging may be increased accordingly.

The method 400 of training the program 300 may repeat after the seed model 310 is generated. The program 300 may be further refined and adapted to a given computer vision task and the associated environmental condition by repeating the steps 410, 412, 414, and 416 as many times as desired. As these steps are repeated, the program 300 and the system 100 may become better (e.g., more efficient) at accomplishing the computer vision task at hand. Updating the program 300 in this manner may also allow the program 300 to adapt to changes in environmental conditions, such as changes in lighting and ambient temperature, as well as production line 60 changes such as when parts become worn or replaced. If a new characteristic is identified or created in the future, it may be integrated into the program 300.

The method 400 described above may produce different programs 300 for different imaging device 130 located at different areas of the same production line 60. This may occur because each of the imaging devices 130 may be situated in different environmental conditions (e.g., lighting may differ from one camera to the next), because the speed of the section of the line 60 associated with one imaging device 130 is different from the speed of the section of the line 60 associated with another imaging device 130, et cetera. The hub 110 (e.g., the computing system 200 thereof) may house each of these different programs 300 such that a plurality of imaging devices 130 may be operated by a single hub 110. For instance, the particular computer vision system 100 displayed in FIG. 2 may have a first program 300 for the first camera 132, a second program 300 for the second camera 134, and a third program 300 for the third camera 136 carried out by a solitary hub 110. In some embodiments, the program 300 may be standardized or consolidated across the imaging devices 130 such that it can function effectively notwithstanding the different settings in which the various imaging device 130 are operating.

The artisan would recognize that the steps of the method 400 may be readily omitted, added to, and/or modified to implement the various embodiments of the computer vision system described herein. For example, one or two of the steps for developing the seed model 310 (i.e., the steps 404, 406, and 408) may be omitted in some embodiments where a particular kind of data is not available or is otherwise undesirable. As another example, multiple devices 130, 130' may use the same seed model 310, before diverging and carrying out their own unique versions of steps 410, 412, 414, and 416.

Figure 11:
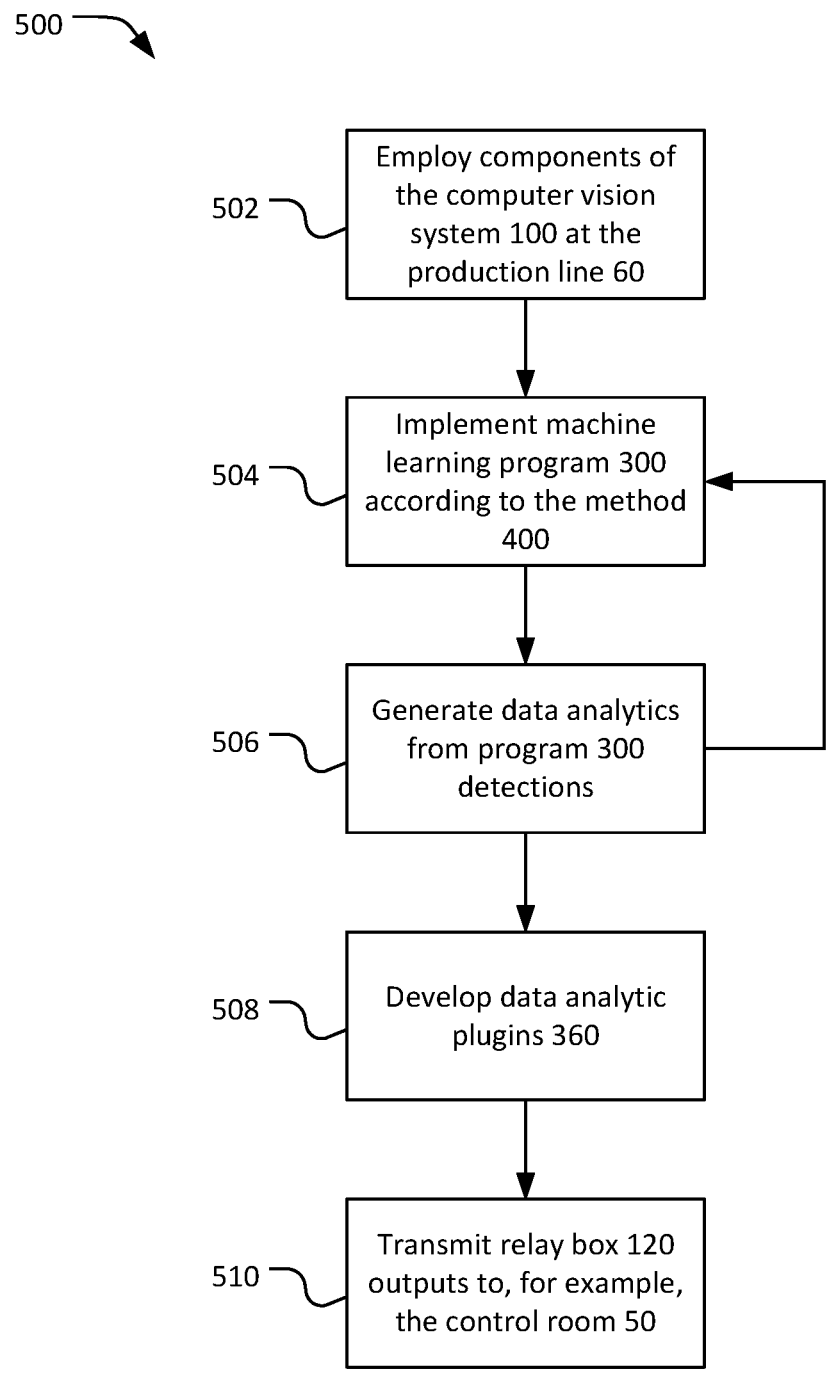
FIG. 11 is a flowchart depicting a method of operating the computer vision system of FIG. 1, according to an embodiment.

FIG. 11 shows a method 500 for operating the various computer vision system embodiments described herein. The method 500 may be used to, for example, monitor a production line 60. First, at step 502, the system 100 is deployed at a production line 60. This may involve installing the hub 110, the relay box 120, the networking device 140, and one or more imaging devices in, on, or around the production line 60. In embodiments, enclosures 150 with cameras 130' and UV lights 160 may be installed at this time (e.g., alternatively or additionally to the devices 130). Then, at step 504, the machine learning program 300 may be implemented with system 100 according to the method 400. A program 300 may be generated for each of the imaging devices 130, 130' by carrying out the method 400 steps for each device 130, 130' installed.

Data generated (e.g., object 70 detections) by the imaging devices 130, 130' and the computing system 200 (e.g., the object 70 detections thereof) may, at step 506, be converted into an easily digestible format. This process may involve, for example, converting the digital data of the hub 110 into an eight-bit analog signal via the relay box 120. In embodiments, data analytics generated here may be reimplemented back into the program 300 to further refine the program 300 or otherwise affect program 300 performance. Step 508 may involve developing one or more data analytic plugins 360 where data (e.g., detections made, device 130, 130' snapshots, etc.) generated by the system 100 may be viewable on a device, such as a graphical user interface of the computing system 200 or a personal computer of the user. The data analytic plugins 360 may facilitate pattern recognition in production line 60 operation or may otherwise assist in determining production line 60 issues and their cause. The data analytics generated, such as the eight-bit signal created by the relay box 120 may, at step 510, be transmitted. The output of the relay box 120 may be received by, for instance, the control room 50 of the production line 60. This output may take the form of an alert, such as an alert generated in response to an incident detection (i.e., when a plurality of object 70 defects are detected). There the user may view this output and may correspondingly modify performance of the production line 60. In embodiments, the relay box 120 output may automatically affect production line operation, such as a situation where the system 100 is configured to halt operation of the production line 60 in response to a significant incident detection.

The artisan would recognize that the steps of the method 500 may be readily omitted, added to, and/or modified to implement the various embodiments of the computer vision system described herein. For example, the step of developing data analytic plugins 360 may be omitted in some embodiments.

The artisan would appreciate that the number and arrangement of system 100 components, such as those depicted in FIG. 2, are intended to illustrate embodiments of the computer vision system, and that such depictions do not limit the scope of the disclosure. The artisan would also understand that the system 100 may comprise as many hubs 110, relay boxes 120, imaging devices 130, networking devices 140, and/or computing systems 200 as is suitable for a given computer vision application, and that such embodiments are contemplated herein and within the scope of the disclosure. Furthermore, computer vision system embodiments disclosed herein may be used with other suitable production line computer vision applications, alternatively or in addition to the metal can application examples used herein. For example, computer vision system 100 embodiments may be adapted to implement computer vision applications involving glass bottle production, plastic bottle production, palletization processes, packaging processes, et cetera. In yet more embodiments, the computer vision system embodiments disclosed herein may be readily modified to carry out any suitable computer vision task where one or more entities are to be detected, one or more characteristics, conditions, and/or statuses of said entity are to be monitored for, and where the key components of the gathered information are to be extracted and outputted. In still more embodiments, the computer vision system may be modified to use and analyze data from any suitable type of imaging technology now known or subsequently developed, such technology for imaging objects outside the normal human visual range, infrared imaging, magnetic resonance imaging, radiography imaging, ultrasound imaging, et cetera.

Thus, as has been described, the computer vision system embodiments disclosed herein, such as the embodiment 100 may impart advantages over the conventional computer vision systems. For one, the system 100 may monitor a larger number of objects at once, a task which conventional systems struggle with. The system 100 may track these multiple objects for a longer period of time in the camera frame, which may allow the system 100 to develop more accurate detections. The data used may be relatively safe from security breaches since the image data collected by the imaging devices 130 may be air-gapped, and the data transmitted by relay box 120 may be an eight-bit analog signal (or a different, easily digestible signal). This relay box 120 output may also serve to significantly reduce the file size of the data being transmitted, allowing faster transmittal. A system, such as a production line control room 50, may receive this transmittal relatively faster than conventional systems, allowing the system 100 and its connected systems to respond in real time to imaging device 130 detections.

The machine learning program 300 described herein may be readily adapted for each imaging device 130, allowing the system 100 the flexibility to address a large range of applications. Furthermore, the program 300 may be updated in real time through the hub 110 with little to no impact on system 100 performance. Implementing the system 100 with a production line 60 may be significantly easier and less costly than implementing conventional computer vision systems, as little to no modification to the production line 60 is required (indeed, in some embodiments, the imaging system 100 may be installed and be made operational without affecting the production line 60 at all). Finally, the system 100 may facilitate the discovery of object defects that would otherwise be extremely difficult, if not outright impossible, for other computer vision systems to detect (e.g., use of UV light to determine whether a can is appropriately coated).

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the figures necessarily need be carried out in the exact order depicted.

The invention claimed is:

1. A method of monitoring objects conveyed on a mass packaging line, the method comprising:
    associating an enclosure with the mass packaging line such that the objects on the mass packaging line travel through the enclosure;
    arranging at least one ultraviolet light with the enclosure;
    associating at least one imaging device with the enclosure;
    capturing image data using the imaging device while the objects pass through the enclosure on the mass packaging line and the ultraviolet light shines ultraviolet light onto the objects;
    using a processor having associated therewith a memory to process the image data to determine a characteristic of at least one of the objects;
    wherein, the objects are conveyed on the mass packaging line in a configuration other than a single file.

2. The method of claim 1, further comprising configuring the enclosure to block at least some visible light.

3. The method of claim 1, further comprising using the processor to divide the mass packaging line into a plurality of zones.

4. The method of claim 1, further comprising communicating information about the image data using a relay.

5. The method of claim 4, wherein the relay includes a plurality of switches and each of the plurality of switches has two positions.

6. The method of claim 1, wherein determining the characteristic of at least one of the objects includes determining whether the at least one of the objects includes a coating.

7. The method of claim 1, wherein the imaging device includes a plurality of imaging devices.

8. The method of claim 1, further comprising training a machine learning model using training data to determine the characteristic of the at least one of the objects.

9. The method of claim 1, further comprising dividing an imaging area of the at least one imaging device into an upstream tracking portion and a downstream counting portion.

10. The method of claim 9, wherein the training data includes live data.

11. The method of claim 1, further comprising using the imaging device to determine a defect in an object.

12. The method of claim 11, wherein the defect includes one of a deformity and a defect in how the object is oriented.

13. The method of claim 1, further comprising associating a second imaging device in an upstream section to monitor for a defective dead plate.

14. A method of monitoring objects conveyed on a mass packaging line, the method comprising:
    creating image data by imaging objects on the mass packaging line using an imaging device while the objects are exposed to a light; and
    using a processor having memory associated therewith to process the image data to determine a characteristic of at least one of the objects;
    wherein the objects are conveyed on the mass packaging line in a configuration other than a single file.

15. The method of claim 14, wherein the light is an ultraviolet light.

16. The method of claim 15, further comprising associating an enclosure with the mass packaging line.

17. The method of claim 16, further comprising configuring the enclosure to block visible light.

18. The method of claim 14, further comprising using a relay to communicate information associated with the image data.

19. The method of claim 18, wherein the relay is operable to alter an operation of the mass packaging line based on the information.

20. A method of monitoring cans conveyed on a mass packaging line, the method comprising:
- associating an enclosure with the mass packaging line such that the cans on the mass packaging line travel through the enclosure;
- arranging at least one ultraviolet light with the enclosure;
- associating at least one imaging device with the enclosure;
- capturing image data using the imaging device while the cans pass through the enclosure on the mass packaging line and the ultraviolet light shines ultraviolet light onto the cans; and
- using a processor having associated therewith a memory to process the image data to determine a characteristic of at least one of the cans;
- wherein, the cans are conveyed on the mass packaging line in a configuration other than a single file.

* * * * *